United States Patent
Turski et al.

(10) Patent No.: US 8,403,812 B2
(45) Date of Patent: Mar. 26, 2013

(54) METHOD AND SYSTEM FOR CONTROLLING A VEHICLE ENGINE DURING A PERFORMANCE SHIFTING MANEUVER

(75) Inventors: Michael P. Turski, Rochester Hills, MI (US); Kevin A. O'Dea, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1092 days.

(21) Appl. No.: 12/362,973

(22) Filed: Jan. 30, 2009

(65) Prior Publication Data

US 2010/0197458 A1    Aug. 5, 2010

(51) Int. Cl.
*B60W 10/04* (2006.01)
(52) U.S. Cl. .................................. 477/111; 477/109
(58) Field of Classification Search .................. None
See application file for complete search history.

(56) References Cited

U.S. PATENT DOCUMENTS 7,300,381 B2 * 11/2007 Badillo et al. ................ 477/102
2006/0142118 A1 * 6/2006 Kupper et al. ................ 477/107

* cited by examiner

*Primary Examiner* — David D Le
*Assistant Examiner* — Erin D Bishop
(74) *Attorney, Agent, or Firm* — Lionel D. Anderson; Reising Ethington P.C.

(57) ABSTRACT

An exemplary engine control system and method for controlling a vehicle engine during certain shifting maneuvers that involve a manual transmission, such as a 'no-lift upshift' where the driver does not release the accelerator pedal during manual shifting. The engine control method may be used to temporarily control the vehicle engine during a no-lift upshift maneuver so that the engine performs well without reaching excessively high engine speeds that could result in vehicle instability or damage. The engine control method described herein may be used with other performance driving maneuvers and techniques as well, such as a power shift maneuvers, etc.

20 Claims, 2 Drawing Sheets

METHOD AND SYSTEM FOR CONTROLLING A VEHICLE ENGINE DURING A PERFORMANCE SHIFTING MANEUVER

TECHNICAL FIELD

The present invention generally relates to controlling a vehicle engine and, more particularly, to controlling a vehicle engine during certain performance shifting maneuvers that involve a manual transmission.

BACKGROUND

For vehicles having a manual transmission, shifting gears generally involves the driver engaging a clutch pedal, disengaging an accelerator pedal, and manipulating a gear shifter to switch between gears. Once the driver has selected a desired gear with the gear shifter, the clutch pedal is disengaged at the same time that the accelerator pedal is gently re-engaged; this typically results in a smooth transition from one gear to another.

During performance driving, however, the driver may want to keep the accelerator pedal significantly engaged while upshifting the manual transmission; a technique sometimes referred to as a "no-lift upshift." Although this type of performance driving technique may reduce the shifting time and hence increase the overall acceleration of the vehicle, it can also put stress on the engine, transmission and other parts of the vehicle drivetrain.

SUMMARY OF THE INVENTION

According to one embodiment, there is provided a method for controlling a vehicle engine that is coupled to a manual transmission. The method may comprise the steps of: (a) evaluating at least one driver operating condition that is representative of driver intent; (b) using the at least one driver operating condition to determine the likelihood of a performance shifting maneuver with the manual transmission; and (c) if a performance shifting maneuver with the manual transmission is likely, then controlling the output of the vehicle engine during some portion of the performance shifting maneuver.

According to another embodiment, there is provided a method for controlling a vehicle engine that is coupled to a manual transmission. This method may comprise the steps of: (a) evaluating a clutch signal; (b) using the clutch signal to anticipate a no-lift upshift maneuver with the manual transmission; and (c) if a no-lift upshift maneuver with the manual transmission is anticipated, then limiting the vehicle torque during some portion of the no-lift upshift maneuver.

BRIEF DESCRIPTION OF THE DRAWINGS

Preferred exemplary embodiments of the invention will hereinafter be described in conjunction with the appended drawings, wherein like designations denote like elements, and wherein.

DETAILED DESCRIPTION OF THE PREFERRED EMBODIMENTS

Figure 1:
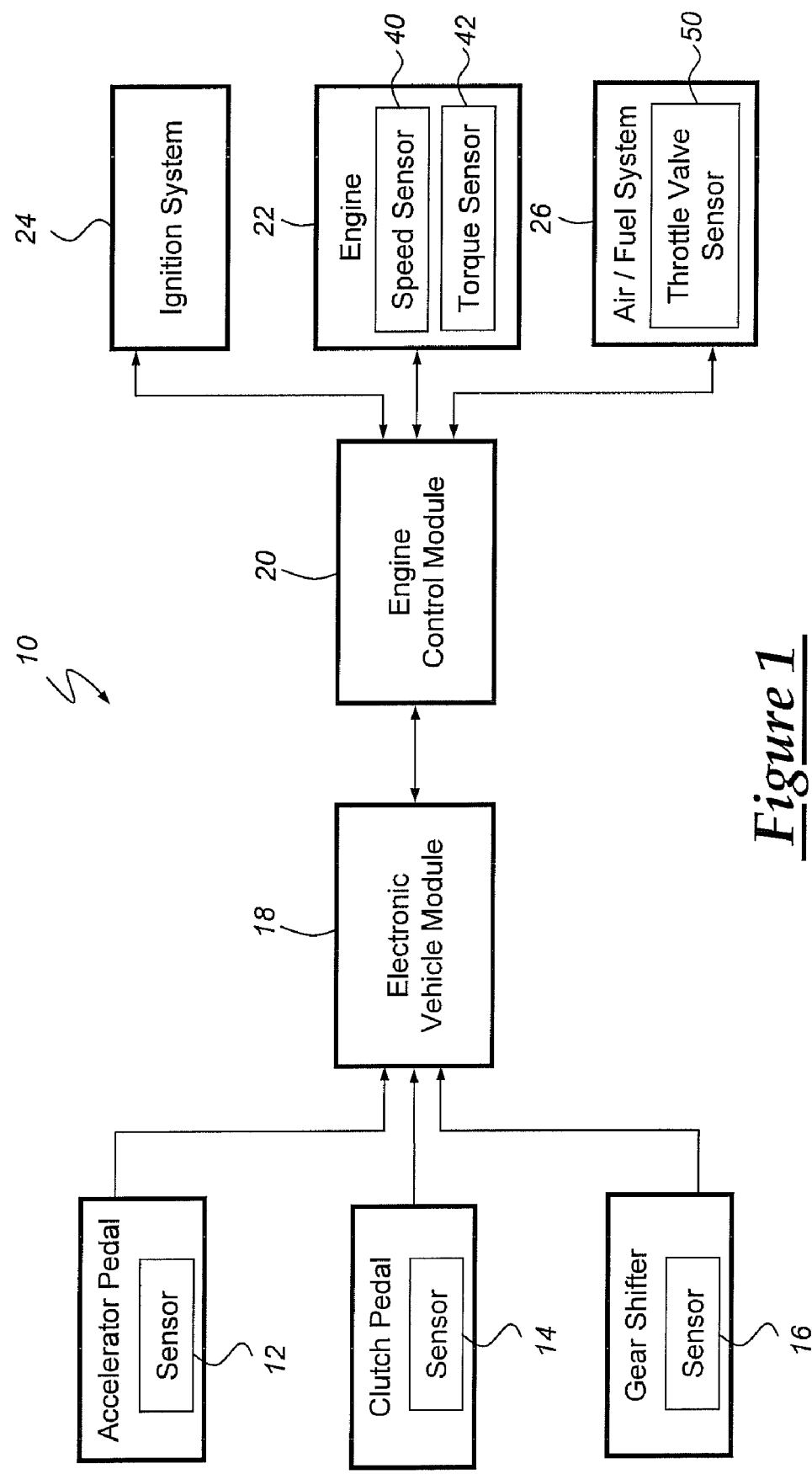
FIG. 1 is a block diagram of an exemplary engine control system.

With reference to FIG. 1, there is shown portions of an exemplary engine control system 10 that may be used to control a vehicle engine during certain shifting maneuvers that involve a manual transmission, such as no-lift upshifts and other performance shifting maneuvers. It should be appreciated that FIG. 1 is only a schematic representation of certain portions of an engine control system and that the method described herein could be used with any number of different systems and is not limited to the exemplary one shown here. According to this particular embodiment, engine control system 10 generally includes an accelerator pedal sensor 12, a clutch pedal sensor 14, a gear shifter sensor 16, an electronic vehicle module 18, an engine control module 20, an engine 22, an ignition system 24, and an air/fuel system 26.

Any number of different sensors, components, devices, modules, etc. may provide engine control system 10 with information or other input that could be used with the engine control method described herein. These include, for example, the exemplary sensors shown in FIG. 1 as well as others that are known in the art but are not shown here. It should be appreciated that accelerator pedal sensor 12, clutch pedal sensor 14, gear shifter sensor 16, as well as any other sensor located in and/or used by engine control system 10 may be embodied in hardware, software or some combination of both. These sensors may directly sense the conditions for which they are provided, or they may indirectly determine or calculate conditions based on readings taken from other sensors, components, devices, modules, parts of the system, etc. Furthermore, these sensors may be directly coupled to electronic vehicle module 18, indirectly coupled via other electronic components such as engine control module 20, coupled over a vehicle communications bus, network, etc., or coupled according to some other arrangement known in the art. These are only some of the possibilities, as any type of sensor or sensor arrangement known in the art could also be used.

Accelerator pedal sensor 12 provides engine control system 10 with an accelerator signal that is generally representative of the position, movement and/or state of an accelerator pedal. Skilled artisans will appreciate that a number of different types of accelerator pedal sensors could be used; these include non-contact-type sensors (e.g., optical sensors, electromagnetic sensors, etc.), as well as contact-type sensors (e.g., potentiometers, contact switches, etc.). In an exemplary embodiment, accelerator pedal sensor 12 includes a non-contact-type sensor with a Hall-Effect element and is operably coupled to the accelerator pedal so that it can determine the current position, rotational velocity and/or rotational acceleration of the accelerator pedal.

Clutch pedal sensor 14 provides engine control system 10 with a clutch signal that is generally representative of the position, movement and/or state of a clutch pedal. As with the accelerator pedal sensor, there are a number of different types of sensors that could be used, including the non-contact-type and contact-type sensors mentioned above. In an exemplary embodiment, clutch pedal sensor 14 includes a non-contact-type sensor with a Hall-effect element that is operably coupled to the clutch pedal so that it can determine its current position, rotational velocity and/or rotational acceleration. In another exemplary embodiment, clutch pedal sensor 14 includes a contact-type sensor with an electronic switch that indicates the status or state of the clutch pedal; that is, whether or not the clutch pedal is 'engaged' or 'disengaged'. Other measurements or readings could be used to determine or calculate the position or status of the clutch pedal, instead of directly sensing it. For instance, clutch pedal sensor 14 may utilize the displacement of a master and/or slave cylinder, the state of a clutch release bearing, the speeds of input and/or output shafts, or some other method known in the art to gather information regarding the clutch pedal.

Gear shifter sensor 16 provides engine control system 10 with a gear signal that is generally representative of the present gear selection of the manual transmission. For example, gear shifter sensor 16 may include an actual sensing device located near the gear shifter or it may be located elsewhere in the vehicle powertrain, to cite a few possibilities. In an exemplary embodiment, gear shifter sensor 16 provides current gear selection information to electronic vehicle module 18 or some other device so that the module can not only determine the current gear of the manual transmission, but can also keep a record of the shifting or gear transition history (e.g., determining that the manual transmission has undergone a $1^{st}$ to $2^{nd}$ gear upshift, a $3^{rd}$ to $2^{nd}$ gear downshift, etc.). As mentioned above, it is possible for gear shifter sensor 16 to provide the gear signal to electronic vehicle module 18 via engine control module 20 or some other suitable vehicle component.

Electronic vehicle module 18 is an electronic device that is located in the vehicle and may be used to control, or at least influence, engine performance during a performance shifting maneuver, such as a no-lift upshift. Depending on the particular embodiment, electronic vehicle module 18 may be a stand-alone component (as schematically illustrated in FIG. 1), it may be incorporated or included within another vehicle electronic module (such as an engine control module), or it may be part of a larger network or system (such as a traction or stability control system, etc.), to name a few possibilities. According to an exemplary embodiment, electronic vehicle module 18 is a traction control module and receives input from sensors 12-16, as well as from items 22-26 via engine control module 20. The traction control module may perform a number of functions; these could include, for example, controlling certain engine operations during specific operating conditions (e.g., manipulating engine torque and/or speed during a no-lift upshift), controlling power distribution during slippery road conditions, maintaining a stability control system for the vehicle, recording information and data, communicating with other devices inside or outside of the vehicle, as well as all other known functions.

Electronic vehicle module 18 may include any variety of electronic processing devices, memory devices, input/output (I/O) devices, and other known components. The electronic vehicle module can be electronically connected to other vehicle devices and modules via a suitable vehicle communications network, and can interact with them when required. In an exemplary embodiment, electronic vehicle module 18 includes an electronic processing device that executes electronic instructions that are part of software, firmware, programs, algorithms, scripts, etc. and can be stored in memory devices of module 18. These electronic instructions may govern the engine control processes and methods described herein. Electronic vehicle module 18 could also store various sensor readings (e.g., sensor readings pertaining to the accelerator pedal, clutch pedal, gear shifter, engine, ignition system, air/fuel system, etc.), and predetermined values and look-up tables used by one or more algorithms, for example. These are, of course, only some of the possible functions and capabilities of electronic vehicle module 18, as other embodiments could also be used.

Engine control module 20 may perform numerous tasks related to engine performance and, in the exemplary embodiment shown here, acts as an intermediary between electronic vehicle module 18 and items 22-26. As will be subsequently explained, electronic vehicle module 18 can control engine operation during a no-lift upshift by limiting the torque and/or speed of the engine when the clutch is engaged so that the engine speed does not reach undesirably high levels. One way to achieve this is by sending control signals from electronic vehicle module 18 to items 22-26 via engine control module 20. Another way is for electronic vehicle module 18 to be connected to items 22-26 directly or to be connected through some component other than engine control module 20. Because engine control modules are widely known and understood in the art, a detailed description of one has been omitted here.

Engine 22 can be any type of known vehicle engine, including conventional internal combustion engines such as gasoline and diesel engines, as well as other engine types like hybrid engines. According to an exemplary embodiment, engine 22 is a convention gasoline or diesel engine and is part of a drivetrain that includes a manual transmission. Engine 22 may include a number of sensors and sensing devices, including the exemplary speed sensor 40 and torque sensor 42 shown in FIG. 1. Speed sensor 40 provides engine control system 10 with an engine speed signal that is generally representative of the position, velocity and/or acceleration of engine 22. Various types of engine speed sensors are known and could be used here. In one embodiment, speed sensor 40 includes an electromagnetic device (e.g., a Hall effect element) that is mounted near a rotating magnet attached to the crankshaft so that it can generate an engine speed signal that is representative of engine revolutions per unit of time (e.g., revolutions per minute (RPM)). Torque sensor 42 provides engine control system 10 with an engine torque signal that is generally representative of the torque being generated by the engine. Again, numerous types of engine torque sensors and sensing arrangements are known in the art and could be used. According to an exemplary embodiment, torque sensor 42 is operably coupled to one or more points along an input shaft, an output shaft, or both in the vehicle's drivetrain. Regardless of whether torque sensor 42 is an actual piece of hardware that directly measures engine torque or is embodied in software and calculates engine torque from some other information, the torque sensor provides electronic vehicle module 18 with engine torque signals that are generally indicative of the torque at one or more places in the vehicle drivetrain (i.e., from the engine to the drive axle(s)).

Ignition system 24 provides a spark plug in engine 22 with a high voltage pulse that can be used to initiate the combustion process, as is known in the art. Depending on the particular embodiment, ignition system 24 may include a combination of hardware and/or software components that are capable of determining the ignition timing of the engine and delivering a spark to the spark plug accordingly. In an exemplary embodiment, ignition system 24 includes one or more spark plugs, ignition coils, ignition modules, and other related hardware and/or software components. It is possible for ignition system 24 to have its own dedicated electronic ignition module that controls certain aspects of the ignition process, such as ignition timing, etc. But it is also possible for ignition system 24 to receive control signals from engine control module 20 or some other source, so that these components control ignition system operation. It should be appreciated that ignition system 24 is merely exemplary and that other systems known in the art could also be used.

Air/fuel system 26 provides a combustion chamber in engine 22 with an air/fuel charge that can be used in the combustion process, as is known in the art. Air/fuel system 26 can include one of a number of different known types of systems. These include, for example, central-point injection (CPI) or central-point fuel injection (CPFI) systems, multipoint fuel injection (MPFI) systems, direct-inject (DI) systems, sequential- and batch-fired fuel injection systems, other types of electronic fuel injection (EFI) systems, as well as any other fuel injected, carbureted or other air/fuel delivery systems. In an exemplary embodiment, air/fuel system 26 is an EFI system that includes a throttle valve sensor 50, a fuel pump (not shown) for pressurizing the fuel, and a nozzle/valve arrangement (not shown) that uses an electronically controlled solenoid to release the pressurized fuel in such a way that it becomes atomized before it is provided to the combustion chamber. As with ignition system 24, air/fuel system 26 could have its own dedicated electronic ignition module that controls certain aspects of the air/fuel delivery process, such as adjusting the air/fuel ratio, or it could receive control signals from engine control module 20 or some other source. Again, other types of air/fuel systems, including those that use carburetors, could be used instead.

Throttle valve sensor 50 provides engine control system 10 with a throttle signal that is generally representative of the present position and/or state of the throttle valve, which in turn is connected to the accelerator pedal and controls the amount of air entering engine 22. Throttle valve sensor 50 may include an actual sensing device located near the throttle valve or it may be located elsewhere and calculate or estimate the throttle valve position based on other information. In an exemplary embodiment, throttle valve sensor 50 is located near a butterfly valve spindle and directly senses the throttle valve state or position, this information is then sent as a throttle signal to electronic vehicle module 18 via engine control module 20. However, other arrangements and connections could be used. In another embodiment, engine control module 20 maintains empirically-based lookup tables or other data structures that indicate the current position and/or state of the throttle valve, and provides this information to vehicle electronic module 18 when requested.

Figure 2:
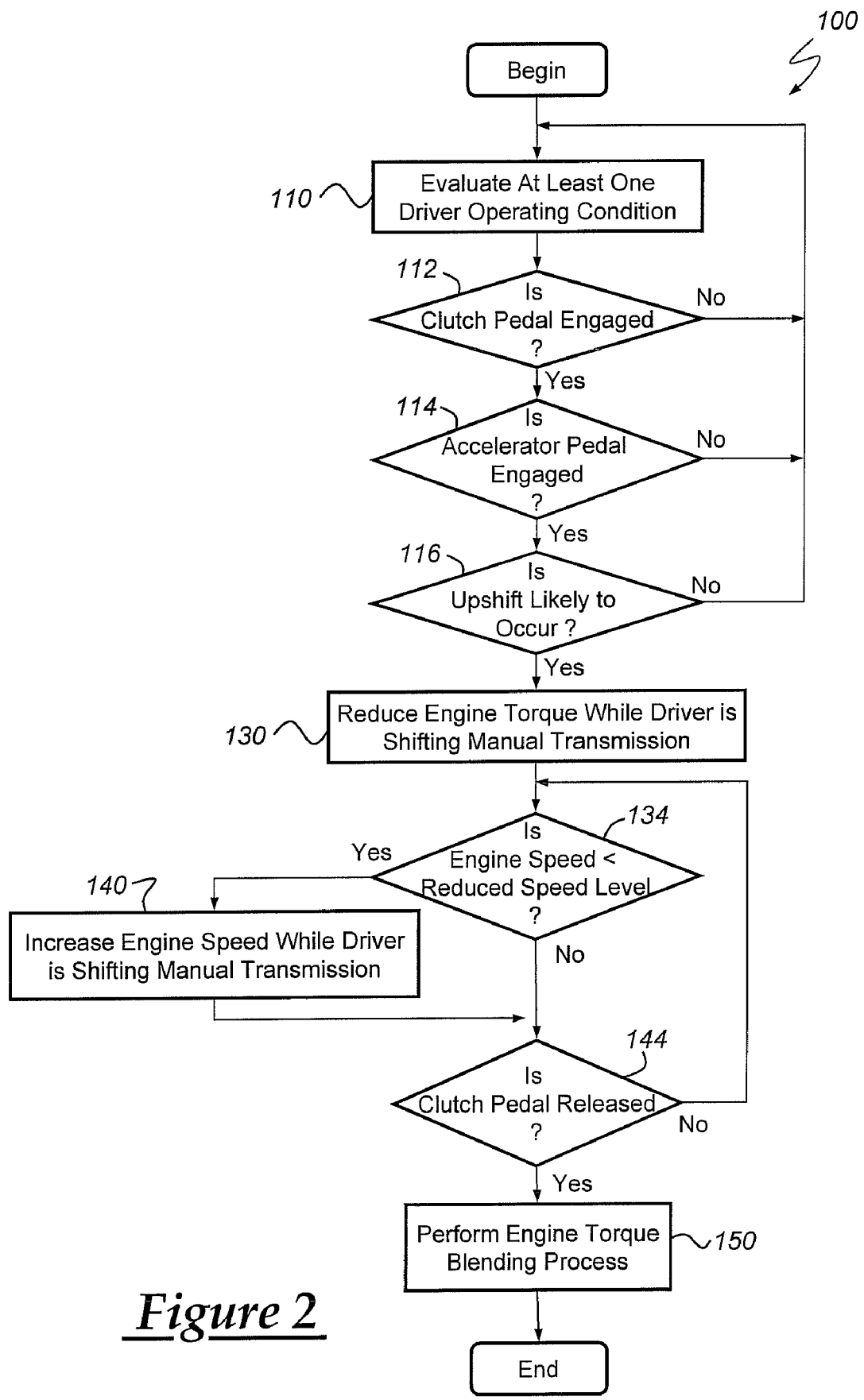
FIG. 2 is a flowchart illustrating an exemplary method for controlling a vehicle engine during a performance shifting maneuver, such as a no-lift upshift, and may be used with the engine control system of FIG. 1.

Turning to FIG. 2, there is shown an exemplary embodiment 100 of a method for controlling a vehicle engine during a performance shifting event, such as a no-lift upshift maneuver. As previously mentioned, a no-lift upshift is a performance driving maneuver where the clutch pedal is engaged while still maintaining pressure on the accelerator pedal. Put differently, the driver does not lift up on the accelerator pedal while upshifting to a higher gear of the manual transmission; hence, the "no-lift upshift." By maintaining the accelerator pedal in a significantly engaged position while upshifting, the driver is able to reduce the shift time of the manual transmission and hence increase the acceleration of the vehicle. Although a no-lift upshift may improve the acceleration or performance of the vehicle, it may also result in excessive engine speeds and introduce stress on certain components of the vehicle drivetrain. Thus, engine control method 100 may be used to temporarily control the vehicle engine during a no-lift upshift maneuver so that the engine performs well without reaching excessive engine speeds that could result in vehicle damage. It should be appreciated that while the following exemplary description is in the context of a no-lift upshift, the engine control method is not limited to such use. The engine control method described herein may be used with other performance driving maneuvers and techniques as well, such as a power shift maneuvers, etc.

Beginning with step 110, the method evaluates at least one driver operating condition. A 'driver operating condition' broadly includes any measurement, reading, condition, status or state that is gathered from the vehicle and is representative of driver intent. Different types of driver operating conditions, as well as techniques for evaluating them, may be used. Some examples of suitable driver operating conditions include accelerator pedal status, clutch pedal status, gear shifter status for a manual transmission, and steering wheel angle, to name a few. In the example of accelerator pedal status, the position of the accelerator pedal is representative of the driver's intent with respect to vehicle speed and/or acceleration; thus, sensing or otherwise determining the position of the accelerator pedal enables method 100 to evaluate this driver operating condition. In an exemplary embodiment of step 110, electronic vehicle module 18 receives an accelerator signal from accelerator pedal sensor 12, a clutch signal from clutch pedal sensor 14, and a gear signal from a gear shifter sensor 16; all of which are indicative of driver operating conditions. It is also possible for electronic vehicle module 18 to receive driver operating conditions, as well as other information and data, from engine control module 20 or some other source.

In steps 112 and 114, the method determines whether or not the clutch pedal and the accelerator pedal, respectively, are sufficiently engaged. This determination may be made in a number of different ways. For example, steps 112 and/or 114 could use the driver operating conditions gathered previously to determine the position of the clutch and accelerator pedals; if the pedals are depressed beyond a certain rotational position, then they could be considered engaged. It should be appreciated that the clutch and accelerator pedals do not necessarily have to be at the end of their pedal travel (i.e., pushed against the floorboard) in order for steps 112 and 114 to consider them sufficiently engaged. Any number of different techniques, including those that use static and dynamic engagement points, could be used to determine the sufficiency of pedal engagement. If steps 112 or 114 determine that the clutch or accelerator pedals are not sufficiently engaged, then control returns to step 110 for continued monitoring of driver operating conditions. If both the clutch and the accelerator pedals are engaged—that is, the driver has depressed the clutch without significantly letting up on the accelerator—then control passes to step 116. The evaluations made in steps 112 and 114 may be made by traction control module 18 or some other device.

Next, step 116 determines if an upshift is likely to occur. An upshift typically involves shifting to a higher gear; i.e., shifting from $1^{st}$ to $2^{nd}$ gears, from $2^{nd}$ to $3^{rd}$ gears, from $2^{nd}$ to $4^{th}$ gears, etc. Step 116 can make this determination in one of a variety of ways. According to one embodiment, step 116 gathers information from any combination of sensors, including sensors 12-16 which provide driver operating conditions and sensors 40-42 and 50 which provide vehicle operating conditions, and uses this information to determine the likelihood that the driver will upshift the manual transmission. Stated differently, step 116 may use a variety of inputs and techniques to anticipate an upshift and to distinguish that situation from a likely downshift, where the driver may want to 'blip the throttle' to match the engine speed with the downshifted gear (e.g., a heel-toe downshift). Step 116 could use any known technique for determining the likelihood or anticipating an upshift with the manual transmission. Although method 100 could be adapted to address a no-lift downshift, the particular embodiment shown in FIG. 2 is particularly well suited for no-lift upshift maneuvers. If an upshift maneuver or event is unlikely or is otherwise not anticipated, then the method loops back to step 110 to keep monitoring driver operating conditions. If steps 112-116 determine that a no-lift upshift is likely to occur, then the method advances so that one or more aspects of engine operation can be temporarily controlled. It should be appreciated that steps 112-116 could be arranged in any order, and are not limited to the exemplary sequence shown in FIG. 2.

If the method anticipates a no-lift upshift or other performance shifting maneuver, then step 130 may control the output of engine 22 during some portion of the performance shifting event. Although possible, it is not necessary to control the engine output during the entire performance shifting event, as step 130 may only control engine torque for a portion or fraction of the no-lift upshift maneuver, for example. In the exemplary embodiment described here, step 130 attempts to control or manage engine torque while step 140 attempts to control or manage engine speed. Skilled artisans will appreciate, however, that manipulation of engine torque can also have an effect on engine speed and vice-versa. Thus, the engine control method described herein is not limited to this particular arrangement, as steps 130 and 140 could attempt to control engine torque, engine speed, some other aspect of engine output, or some combination thereof.

A number of different techniques could be used to limit engine torque and/or engine speed, including those that use ignition system 24, air/fuel system 26, or some combination thereof. In one embodiment, step 130 manipulates the ignition timing of ignition system 24—e.g., ignition timing advances, ignition timing retards, skip sparks, etc.—in order to limit the engine torque. For example, step 130 could perform an ignition timing retard where the spark is purposely delayed by a specific number of degrees, with respect to top dead center (TDC), so that a predictable decrease in engine torque occurs. In another embodiment, step 130 could manipulate the content (e.g., air/fuel ratio), mass, volume, or presence (e.g., cut off the fuel completely) of the air/fuel charge delivered by air/fuel system 26 to the combustion chamber. As with the ignition system manipulation, air/fuel system manipulation could have a predictable effect on engine torque. No matter which method is used to manipulate the output of the vehicle engine, open- and closed-loop control techniques could be employed. In an exemplary embodiment, torque sensor 42 provides vehicle electronic module 18 with an engine torque signal. With this information, vehicle electronic module 18 is able to monitor and adjust the speed, torque, and/or some other engine output in a closed-loop fashion.

In step 130, the method may control or manipulate the engine torque independent of the driver's intent. Put differently, if vehicle electronic module 18 determines that a no-lift upshift maneuver is underway, it may temporarily take over certain engine control operations and automatically provide control signals to ignition system 24 and/or air/fuel system 26. These automatically-generated control signals, as opposed to signals emanating from the accelerator pedal, can temporarily control certain aspects of engine operation. In an exemplary embodiment, step 130 reduces the engine torque to a reduced torque level while the driver is shifting the manual transmission and may continue to do so until the torque blending process of step 150. It is preferable that step 130 refrain from reducing engine torque while power is still being delivered to the drive wheels, as such a power interruption could be noticeable to the driver (this condition should be satisfied so long as the clutch remains engaged, as was checked for in step 112). In most cases, the gear shifting is performed quickly enough that the engine speed does not substantially decrease. If this is the case, then method 100 can bypass the engine speed manipulation in step 140. If, however, during the shifting process the engine speed falls below a reduced speed level, then step 140 can temporarily hold or maintain the engine speed to make up for this slowdown. Step 134 may be used to evaluate the current engine speed against the reduced speed level, which can be stored at vehicle electronic module 18 or elsewhere.

If the current engine speed falls below a reduced speed level, which sometimes occurs during exceptionally long shifts, step 140 may be used to hold or maintain the engine speed so that it can smoothly engage the next gear. As with step 130, a number of different techniques could be used to manipulate or control the engine speed during step 140. According to one embodiment, vehicle electronic module 18 uses an engine speed signal from speed sensor 40, a throttle signal from throttle valve sensor 50, and closed-loop control to adjust the throttle valve such that a desired engine speed is achieved. Throttle valve manipulation may be used to control engine speed, while ignition system and air/fuel system manipulation may be used to control engine torque. Although the engine speed is temporarily held at an elevated level, it still remains less than the elevated engine speed that would otherwise occur if the engine was allowed to freely rotate with the clutch engaged. By holding or maintaining the engine speed in a controlled and measured way, step 140 may prevent the engine from reaching its rev limit and thus prevent engine control module 20 from engaging in severe correction measures to avoid engine damage (these measures may be effective for preventing damage to the engine, but can be noticeable and undesirable to a driver engaged in performance driving). In addition, step 140 may maintain the engine speed at a hold value that 'rev matches' the vehicle engine to the manual transmission for the anticipated upshift. Other techniques for controlling engine speed could also be used.

Step 144 determines if the clutch pedal is sufficiently released or disengaged. If the clutch pedal is still engaged, then control passes back to step 134 to ensure that the engine speed has not dropped to an unacceptably low level. If the clutch is sufficiently released, then step 150 may perform a torque blending technique to ensure the smooth transition to the next gear. The torque blending technique can be performed in a variety of different ways. According to one embodiment, clutch pedal sensor 14 provides vehicle electronic module 18 with a clutch signal that indicates the position, and hence the rate of positional change, of the clutch pedal. Once the clutch pedal is released beyond a certain pedal position, step 150 stops limiting the engine torque (as mentioned above, the method may continue to limit engine torque between steps 130 and 150) and begins a blending process to bring the actual engine torque in line with that being requested by the driver via the accelerator pedal. Any type of suitable engine torque blending process known in the art could be used. According to one such possibility, step 150 compares the current engine torque (as provided by torque sensor 42) to the requested engine torque (as provided by accelerator pedal sensor 12) and derives a control scheme for matching the two torque values in a smooth fashion. Such a control scheme could employ proportional-integral-derivative (PID) control, or some other known technique, to manipulate ignition system 24 and/or air/fuel system 26. Again, other engine torque modification and blending techniques could also be used.

Because the clutch release time (i.e., the amount of time for the pedal to travel from an engaged to a disengaged position) might be quite brief, step 150 may use an optional 'lead time' that compensates for the rate of pedal travel. Put differently, if the driver is releasing the clutch pedal rapidly (e.g., when the driver side steps the clutch), step 150 may need to begin the torque blending process sooner because the clutch is pivoting back so quickly; this instance would call for a greater lead time to give the torque blending process more time to execute.

If the driver is letting off on the clutch gently, then very little or no lead time may be needed, as the clutch disengagement point gives step 150 enough time to properly blend the engine torque. In another embodiment, the driver may be able to calibrate or otherwise adjust the lead time component by providing engine control system 10 with a 'slider setting' or the like.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, any combination of steps could be used in method 100, including combinations have more steps, less steps, or different combinations of steps as those shown and described. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A method for controlling a vehicle engine that is coupled to a manual transmission, comprising the steps of:
    (a) evaluating at least one driver operating condition that is representative of driver intent;
    (b) using the at least one driver operating condition to anticipate a performance shifting maneuver with the manual transmission; and
    (c) if the performance shifting maneuver with the manual transmission is anticipated, then controlling an output of the vehicle engine during some portion of the performance shifting maneuver.

2. The method of claim 1, wherein step (a) further comprises evaluating the at least one driver operating condition by receiving at least one signal selected from the group consisting of: an accelerator signal, a clutch signal, or a gear signal.

3. The method of claim 2, wherein step (a) further comprises evaluating the at least one driver operating condition by receiving the clutch signal; and
    step (b) further comprises using the clutch signal to anticipate the performance shifting maneuver with the manual transmission.

4. The method of claim 1, wherein step (a) further comprises evaluating the at least one driver operating condition by receiving an accelerator signal, a clutch signal, and a gear signal; and
    step (b) further comprises using the accelerator signal, the clutch signal, and the gear signal to anticipate the performance shifting maneuver with the manual transmission.

5. The method of claim 1, wherein step (b) further comprises using the at least one driver operating condition to anticipate the performance shifting maneuver, wherein the performance shifting maneuver includes a no-lift upshift maneuver with the manual transmission.

6. The method of claim 1, wherein step (c) further comprises controlling the output of the vehicle engine by utilizing an ignition system to limit the engine torque during some portion of the performance shifting maneuver.

7. The method of claim 1, wherein step (c) further comprises controlling the output of the vehicle engine by utilizing an air/fuel system to limit the engine torque during some portion of the performance shifting maneuver.

8. The method of claim 1, wherein step (c) further comprises controlling the output of the vehicle engine by determining if the engine speed has fallen below a reduced speed level during some portion of the performance shifting maneuver, and if the engine speed has fallen below the reduced speed level then increasing the engine speed.

9. The method of claim 1, wherein step (c) further comprises controlling the output of the vehicle engine by using a torque blending technique to match a current engine torque with a requested engine torque.

10. The method of claim 1, wherein the method is generally performed by a traction control module within the vehicle.

11. A method for controlling a vehicle engine that is coupled to a manual transmission, comprising the steps of:
    (a) evaluating at least one driver operating condition that is representative of driver intent;
    (b) using the at least one driver operating condition to anticipate a performance shifting maneuver with the manual transmission; and
    (c) if the performance shifting maneuver with the manual transmission is anticipated, then controlling an output of the vehicle engine by determining if the engine speed has fallen below a reduced speed level during some portion of the performance shifting maneuver, and if the engine speed has fallen below the reduced speed level then utilizing a throttle valve to increase the engine speed.

12. A method for controlling a vehicle engine that is coupled to a manual transmission, comprising the steps of:
    (a) evaluating at least one driver operating condition that is representative of driver intent;
    (b) using the at least one driver operating condition to anticipate a performance shifting maneuver with the manual transmission; and
    (c) if the performance shifting maneuver with the manual transmission is anticipated, then controlling an output of the vehicle engine during some portion of the performance shifting maneuver by using a torque blending technique to match a current engine torque with a requested engine torque, and calculating a lead time to compensate for a rate of pedal travel.

13. The method of claim 12, wherein step (c) further comprises calculating the lead time to compensate for the rate of pedal travel, and receiving a slider setting from a driver in order to calibrate the lead time.

14. A method for controlling a vehicle engine that is coupled to a manual transmission, comprising the steps of:
    (a) evaluating a clutch signal;
    (b) using the clutch signal to anticipate a no-lift upshift maneuver with the manual transmission; and
    (c) if the no-lift upshift maneuver with the manual transmission is anticipated, then limiting the engine torque during some portion of the no-lift upshift maneuver.

15. The method of claim 14, wherein step (a) further comprises evaluating an accelerator signal and a gear signal; and step (b) further comprises using the clutch signal, the accelerator signal, and the gear signal to anticipate the no-lift upshift maneuver with the manual transmission.

16. The method of claim 14, wherein step (c) further comprises limiting the vehicle torque by determining if the engine speed has fallen below a reduced speed level during some portion of the no-lift upshift maneuver, and if the engine speed has fallen below the reduced speed level then increasing the engine speed.

17. The method of claim 16, wherein step (c) further comprises utilizing a throttle valve to increase the engine speed.

18. The method of claim 14, further comprising the step of:
(d) using a torque blending technique to match the current engine torque with a requested engine torque.

19. The method of claim 18, wherein step (d) further comprises using the torque blending technique to match the current engine torque with the requested engine torque, and calculating a lead time to compensate for a rate of pedal travel.

20. The method of claim 19, wherein step (d) further comprises calculating the lead time to compensate for the rate of pedal travel, and receiving a slider setting from a driver in order to calibrate the lead time.

* * * * *